Nov. 8, 1927.  
A. PERSU  
1,648,505  
STREAMLINE POWER VEHICLE  
Filed Oct. 30, 1923

Inventor  
A. Persu  
by Langner, Parry, Card & Langner  
Attys.

Patented Nov. 8, 1927.

1,648,505

UNITED STATES PATENT OFFICE.

AUREL PERSU, OF BUCHAREST, RUMANIA.

STREAMLINE POWER VEHICLE.

Application filed October 30, 1923, Serial No. 671,727, and in Germany November 13, 1922.

This invention relates to streamline power vehicles and has for its object to reduce wind resistance to a minimum.

In the usual power vehicles of streamline shape considerable air currents and power losses are caused by the rear wheels and spare wheels disposed outside this shape.

According to the invention provision is made so that with a streamline shape of vehicle the rear wheels in comparison with other vehicles of known type, have a narrower track than the front wheels and similarly to these are contained within the streamline shape, whilst the vehicle, is preferably free from special excrescencies, and may have the space for the passengers at the front and the engine plant at the rear or underneath the space for the passengers. The new vehicle is preferably rear driven without differential gearing. Spare wheels may be arranged vertically behind the rear wheels between the longitudinal beams in the longitudinal direction of the vehicle.

The drawing shows diagrammatically one example of construction.

Figure 1:
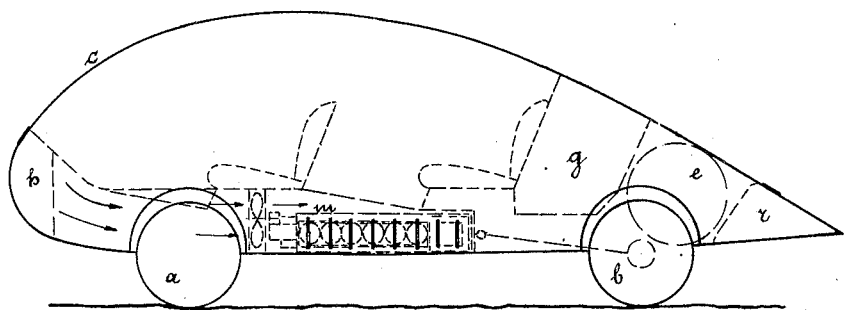
Figure 1 is an elevation.
Figure 2:
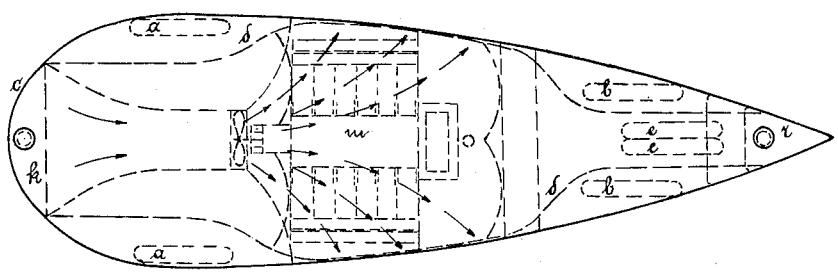
Figure 2 is a plan.

The front wheels, serving as steering wheels a, have a wider wheel track than the rear wheels b which are driven. The various wheels are mounted in the streamline shaped body c.

The spare wheels e are arranged vertically between the longitudinal beams d of the chassis behind the rear wheels b in the longitudinal direction of the vehicle.

The rearwardly disposed motor m drives the wheels b by means of a universal transmission without differential.

The radiator is indicated by k and the fuel tank by r. The inflow and outflow of air are indicated by arrows.

To the new arrangement the following applies:

The endeavour of the motor designer should not lie in the continual increase in the motive power but in the reduction of losses, so that the load to be propelled will be propelled at a higher speed by a motor as small as possible.

For this purpose it is first necessary to take into consideration the shape and the capacity of the vehicle space to be propelled as also its most advantageous use.

In the present construction the first consideration is to provide a unitary enclosing surface for the vehicle, which is free of excrescencies, which also encloses the wheels therein and which conforms as closely as possible with the true streamline shape giving the least air resistance. It is absolutely necessary to mount the wheels inside, as in vehicles, constructed most favourably aerodynamically, they cause a much larger portion of the total air resistance than in an ordinary vehicle.

As is well known the longitudinal vertical sections of a body with the least air resistance are higher at the front than at the rear.

As the space for the passengers requires the highest space, the seats are provided absolutely at the front, the engine plant, however, at the rear. This corresponds with the requirement that the whole vehicle load must be divided substantially uniformly on both axles, for which purpose the front spacious end of the vehicle body must have a smaller specific weight and the rear narrower end of the body a greater specific weight. By accommodating the passengers at the front the space, which in streamline vehicles is available in front of the front wheels within the vehicle body, is utilized in the most advantageous manner, as the front passengers can stretch their legs, whilst the largest portion of the weight of their bodies is disposed rearwardly over the seat which is very desirable for rear wheel drives.

Again in a body with the minimum air resistance the horizontal section is also wider at the front than at the rear. In order that in spite of this the rear wheels may also be enclosed by the unitary enclosing surface, a narrower track is used at the rear. From this there is then also obtained the advantage that the differential becomes unnecessary.

The mechanical drive by means of only a single bevel wheel on the rear axle, which extends right through, instead of the seven toothed wheels on the usual vehicles, reduces the transmission losses and at the same time reduces the unsprung load on the rear axle to a minimum, so that the vehicle travels more smoothly, because the rear wheels may then obtain a good grip on the road.

This simplification further eliminates the known continual jumping and jerking of the vehicle which is caused by the differential, and which causes a considerable loss in energy, and consequently the rear wheels of the vehicle receive an effective undisturbed drive, which is particularly desirable at high speeds. When negotiating curves the slipping of the tyres, in consequence of the narrower rear wheel track, may be entirely neglected as in consequence of the continual slight shocks of the vehicle the minute differences which occur on the right and left hand rear wheels are balanced automatically so that the wear of the tyres remains normal.

The equilibrium of the vehicle when negotiating curves is thus only affected to a degree which may be entirely neglected as the engine plant is contained in the rear narrower half of the vehicle, and the centre of gravity thereof is invariable laterally in distinction from the total weight of the passengers in the front, but by reason of the wider front wheel base any displacement of the weight of the passengers is provided for. Further when negotiating curves, with front wheel steering, the outside wheel describes a circle of larger radius, which is particularly favourable for the absorption of centrifugal force as the narrower rear end of the vehicle always remains within the curve and the momentum by reason of its forward direction will act more upon the front part of the vehicle where the wide wheel base is provided. In this manner the steering mechanism is affected considerably less by the vibrations of the vehicle as, by disposing the steering column on the front end of the longitudinal beam, the longitudinal rod of the steering mechanism has its fulcrum near the axis of the front spring bolt around which the front springs, axle and wheels turn.

As the vehicle has four tracks instead of two it will theoretically travel with a somewhat increased rolling friction on soft, unpaved roads as the rear wheels, during forward travel will not roll in the tracks already made by the front wheels. This, however, only occurs when travelling in a mathematically straight line, which rarely occurs, as the vehicle, in consequence of constantly occurring obstructions will always make slight deviations, even on straight roads, so that also a two track vehicle will rarely leave only two tracks behind. Moreover the automobile is a rapid means of transport which always requires a good road surface; on a good road, however, the rolling resistance of two track and four track vehicles is practically the same.

The possibility of passing around a small obstacle, for example a stone, is somewhat reduced for a four track vehicle, but any unevenness of the road will only meet a four track vehicle once, whereas in two track vehicles there will nearly always be two successive shocks and during the second shock the vehicle will be affected in an unfavourable manner as it is in full swing.

Although completely enclosed the whole engine plant in the new vehicle is easily accessible from all sides as it is disposed in the smaller half of the vehicle.

A space for the reception of spare wheels is provided behind the rear wheels vertically between the longitudinal beams in the longitudinal direction of the vehicle. In this manner the adhesion of the rear wheels is still further increased; also the spare wheels are here conveniently accessible and are protected from the heat of the engine.

The advantage of this streamline vehicle is that, with the best utilization of the space and simplification of transmission, it can present the smallest possible air resistance, whereby the highest speed and the greatest saving in fuel can be effected. This also produces the very important condition in practice that in view of the invention it is possible in power vehicle construction to use smaller motive power as the present motors in ordinary journeys are not utilized to the full extent and are to be regarded as oversized, as they only give their full power at rarely occurring high speeds. By considerably reducing the air resistance, which as is known increases with the cube of the speed, it follows that at the same speed the same load can be transported by a substantially smaller motor, which in ordinary use is fully utilized.

It should not remain unmentioned that by the general arrangement of the new vehicle the passengers, as they are in the foremost position, travel more smoothly, in so far as the seats are provided above a more favourable portion of the chassis and that the inconveniences, such as odour and noise which are connected with engine plant arranged at the front, are eliminated. Foot passengers are less inconvenienced by the new vehicle as the development of dust is reduced considerably.

The drive may be effected by an electric motor instead of by an internal combustion engine. The accumulators, as bodies of high specific weight, would then be preferably arranged at the rear in order to load the rear narrowly spaced driving wheels, and to permit of better adhesion.

What I claim as my invention is:

1. A unitary four-wheeled power vehicle having a body of streamline shape both in elevation and in plan, both pairs of wheels being contained within the plan projection of the body, the body having wheel receiving sockets extending above the path of the generatrix of the lower wall of its body, the track of the rear pair of wheels being less than that of the front pair.

2. A unitary four-wheel power vehicle having a body of streamline shape both in elevation and in plan, both pairs of wheels being contained within the plan projection of the body extending above the path of the generatrix of the lower wall of said body, the body being generally half oval in longitudinal section and generally semicircular in transverse section, the track of the rear pair of wheels being less than that of the front pair.

3. A unitary four-wheel power vehicle having a body of streamline shape both in elevation and in plan, both pairs of wheels being contained within the plan projection of the body, the body being generally half oval in longitudinal section and generally semicircular in transverse section, the track of the rear pair of wheels being less than that of the front pair.

In testimony whereof I have signed my name to this specification.

AUREL PERSU.